United States Patent
Wang et al.

(10) Patent No.: US 6,832,809 B2
(45) Date of Patent: Dec. 21, 2004

(54) SEMI-TRAILER WITH COMBINABLE AND REMOVABLE CARGO CONTAINER BODY

(75) Inventors: Shi-sheng Wang, Shenzhen (CN); Liang-fu Xie, Shenzhen (CN)

(73) Assignee: China International Marine Containers (Group) Co., Ltd., Shenzhen (CN)

( * ) Notice: Subject to any disclaimer, the term of this patent is extended or adjusted under 35 U.S.C. 154(b) by 0 days.

(21) Appl. No.: 10/261,814

(22) Filed: Sep. 30, 2002

(65) Prior Publication Data

US 2004/0201251 A1 Oct. 14, 2004

(51) Int. Cl.[7] .............................................. B62D 25/02
(52) U.S. Cl. ................................................... 296/186.5
(58) Field of Search ........................... 296/181, 193.01, 296/193.03, 193.05, 193.08, 193.09, 36, 100.01, 100.03, 100.15, 100.16, 186.5, 181.7, 100.02

(56) References Cited

U.S. PATENT DOCUMENTS

| | | | | |
|---|---|---|---|---|
| 3,034,824 A | * | 5/1962 | Schubach ................ | 296/181.7 |
| 3,205,002 A | * | 9/1965 | Seng ......................... | 296/181 |
| 3,266,837 A | * | 8/1966 | Stricker, Jr. et al. ........ | 296/181 |
| 3,692,349 A | * | 9/1972 | Ehrlich ..................... | 296/181 |
| 4,007,567 A | * | 2/1977 | Mooney et al. ............. | 296/181 |
| 4,221,427 A | * | 9/1980 | Sentle et al. ................ | 296/181 |
| 4,810,027 A | * | 3/1989 | Ehrlich ..................... | 296/181 |
| 5,041,318 A | * | 8/1991 | Hulls ........................ | 296/181 |
| 5,772,276 A | * | 6/1998 | Fetz et al. .................. | 296/181 |
| 5,890,757 A | * | 4/1999 | Masterson et al. .......... | 296/181 |
| 6,290,285 B1 | * | 9/2001 | McCormack ............... | 296/181 |

* cited by examiner

Primary Examiner—Lori L. Coletta
(74) Attorney, Agent, or Firm—Intellectual Property Law Group LLP; Otto O. Lee; Juneko Jackson

(57) ABSTRACT

An embodiment of the invention relates to a semi-trailer with a combinable and removable cargo container body. The semi-trailer comprises a semi-trailer chassis assembly, a rear frame assembly, a front wall assembly, a pair of side wall assemblies and a roof assembly. The semi-trailer chassis assembly can be removably jointed to an integral made up of the rear, front and the pair of side wall assemblies. The roof assembly can be removably jointed to an integral made up of the rear, front and the pair of side wall assemblies. The side wall assemblies can be removably jointed to the rear frame assembly and the front wall assembly.

32 Claims, 8 Drawing Sheets

SEMI-TRAILER WITH COMBINABLE AND REMOVABLE CARGO CONTAINER BODY

BACKGROUND OF THE INVENTION

The present invention relates to means of transport, and more particularly, to a semi-trailer which is drawn by a tractor.

In the field of vehicle transportation, a type of vehicle knows as a semi-trailer, which has wheels on the bottom of its rear end and has a kingpin on its front end, is hitched to a truck tractor with its kingpin engaged into the fifth wheel of the truck tractor. The most simple and commonly used semi-trailer is the flatbed semi-trailer (i.e., without the top assembly). Along with the development of the needs of users and the cargo form of transportation, semi-trailers having corresponding top assemblies secured on their flatbed are turned out, and have evolved into various kinds of semi-trailers with secured carriages, such as semi-trailers with hard body carriages and semi-trailers with soft body carriages.

The currently used carriage semi-trailer, of which the top assembly is irremovably secured to the chassis assembly, is unitary in its structure and lacks flexibility. Since the original carriage is secured, users must purchase another semi-trailer with a different kind of top assembly when they want to adopt another kind of top assembly. In addition, due to the secured top assembly, the common semi-trailer is very bulky; for users crossing a long distance during delivery of semi-trailer products, the transportation fees will consume a big proportion of the whole cost of those products.

SUMMARY OF THE INVENTION

The aim of the present invention is to provide a combinable and removable semi-trailer, which has the function of a convenient and quickly combinable carriage; it is convenient and flexible for use, and lowers the cost for transportation fees during product delivery.

To realize the above object, the present invention may be made according to embodiments of the present invention.

According to one embodiment of the present invention, a combinable and removable semi-trailer comprises a semi-trailer chassis assembly, a rear frame assembly, a front wall assembly, side wall assemblies and a roof assembly. The present invention is characterized in that, the semi-trailer chassis assembly can be combinably and removably jointed to the rear, front and the side wall assemblies; the roof assembly can be combinably and removably jointed to the rear, front and the side wall assemblies; and said side wall assemblies can be combinably and removably jointed to the rear frame assembly and the font wall assembly.

In another embodiment of the present invention, the semi-trailer chassis assembly is connected to the rear frame assembly and the front wall assembly with screw connectors. In addition, the roof assembly is connected to the rear frame assembly and the front wall assembly with screw connectors.

An embodiment of the semi-trailer, may also have a threshold installed on the bottom side of the rear frame assembly, and a front bottom beam installed on the bottom side of the front wall assembly; a fixing means installed respectively on the front and rear ends of the chassis assembly, where the fixing means has a U-shape sectional inner space. The threshold and front bottom beam may match with the inner space of said fixing means in dimension; the inner space of the fixing means holds the threshold and front bottom beam to fix the rear and front wall assemblies, so as to achieve a connection of the chassis assembly with the rear and front wall assembly.

Other embodiments of the semi-trailer may have the fixing means further connected to the threshold and the front bottom beam with screw connectors. The semi-trailer may have a fixing board installed on the top beams of the rear and front wall assemblies respectively, the two ends of the roof assembly placed directly onto the fixing boards, and the roof assembly connected to the front and rear frame assemblies with connectors.

In addition, a further embodiment of the invention is characterized in that the connectors connecting the roof assembly with said front and rear frame assemblies comprise water proof rubber spacers, which are installed respectively between said roof assembly and the fixing boards of said front and rear frame assemblies; screw connectors; and plate spacers, which are placed between the screw connectors and the waterproof rubber spacers; wherein the close connection of the roof assembly with the front and rear frame assemblies is achieved through the way the water proof rubber spacers, plate spacers and screw connectors are coordinated.

Another embodiment of the semi-trailer, has the side wall assemblies made of a soft body structure. In addition, the side wall assemblies may be made of a hard body structure.

According to another embodiment of the semi-trailer, pulleys are installed on the top of the side wall assemblies; on two sides of the roof assembly are installed tracks matching with the pulleys, and by the coordination of the pulleys and the tracks, the side wall assemblies are slidingly connected with the roof assembly. Further, the semi-trailer, may have rope rails installed on the bottom of the two sides of the chassis assembly; several belts which can be tightened up are installed on the bottom side of the side wall assemblies; on the bottom ends of the belts are installed belt hooks corresponding with the rope rails, whereby during operation, they are used for quickly tightening up the side wall assemblies; and the connection of the side wall assemblies with the chassis assembly is realized by way of the coordination of the rope rails and belts.

The semi-trailer may have hooks installed respectively on the rear ends of the side wall assemblies. Bending hanging boards matching with the hooks are installed on two sides of the rear frame assembly. The side wall assemblies are connected with the rear frame assembly by way of hanging the hooks on the hanging boards.

The semi-trailer may have self-locking tensioners installed on the two sides of the front wall assembly; the side wall assemblies are connected with the front wall assembly by way of winding the front ends of the side wall assemblies around the self-locking tensioners.

The semi-trailer may have the side wall assemblies connected to the chassis, rear, front and roof assemblies with screw connectors. In another embodiment, the semi-trailer may have onwards protruding bottom side beams installed on the two sides of the chassis assembly; a bottom beam installed respectively on the bottom sides of the side wall assemblies, the bottom beam having a downwards opening forming a U-shape sectional inner space, which matches with the bottom side beam in dimension, the two parts are coupled with each other and form a concave-convex coupling, so as to achieve the connection of the side wall assemblies with the chassis assembly.

In yet another embodiment the semi-trailer has a further connection achieved at the convex swelling of the concave-convex coupling with screw connectors. The semi-trailer may have the roof assembly connected to the side wall assemblies with concave-convex coupling. The semi-trailer may also comprise a corner pole installed respectively on both sides of the front wall assembly and rear frame assembly, for the use of connecting the rear and front wall assemblies with the side wall assemblies.

In a further embodiment of the semi-trailer, water proof rubber spacers and plate spacers are further installed on the connecting point of the side wall assemblies with the rear and front wall assemblies. The water proof rubber spacers, plate spacers and side wall assemblies are pressed closely onto the corner poles of both sides of the rear and front wall assemblies with screw connectors so as to realize the connection of the side wall assemblies with the rear and front wall assemblies.

According to other embodiments of the present invention, the screw connectors are threaded bolts, bars or nails. In another embodiment of the present invention, the side wall assemblies of the top assembly (front, rear, side and roof assemblies) are of soft body structure, while the front, rear and roof assemblies are of hard body structure. Alternatively, the front, rear and roof assemblies may be of a composite structure made up of hard material frames and soft material coverings; the soft body structure may be made up of a soft material such as canvas, or a composite material of fiber and rubber.

In another embodiment of the present invention, the top assembly is of a hard body structure where all assemblies are made of hard materials, which may be selected from steel, aluminum and composite materials.

According to one aspect of the present invention, by the way of the combinable and removable connection between the chassis assembly and each part of the top assemblies, an identical chassis assembly may be combined with semi-trailers of different specifications and forms. This makes it convenient to satisfy the needs of transportation and reduce the cost.

According to another aspect of the present invention, different ways of connection are provided according to the concrete materials used in soft body and hard body semi-trailers, enabling the assembly and combination of a semi-trailer to be easily implemented, while the tightness and stability of the connection are, also taken into consideration.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF THE PREFERRED EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Figure 1:
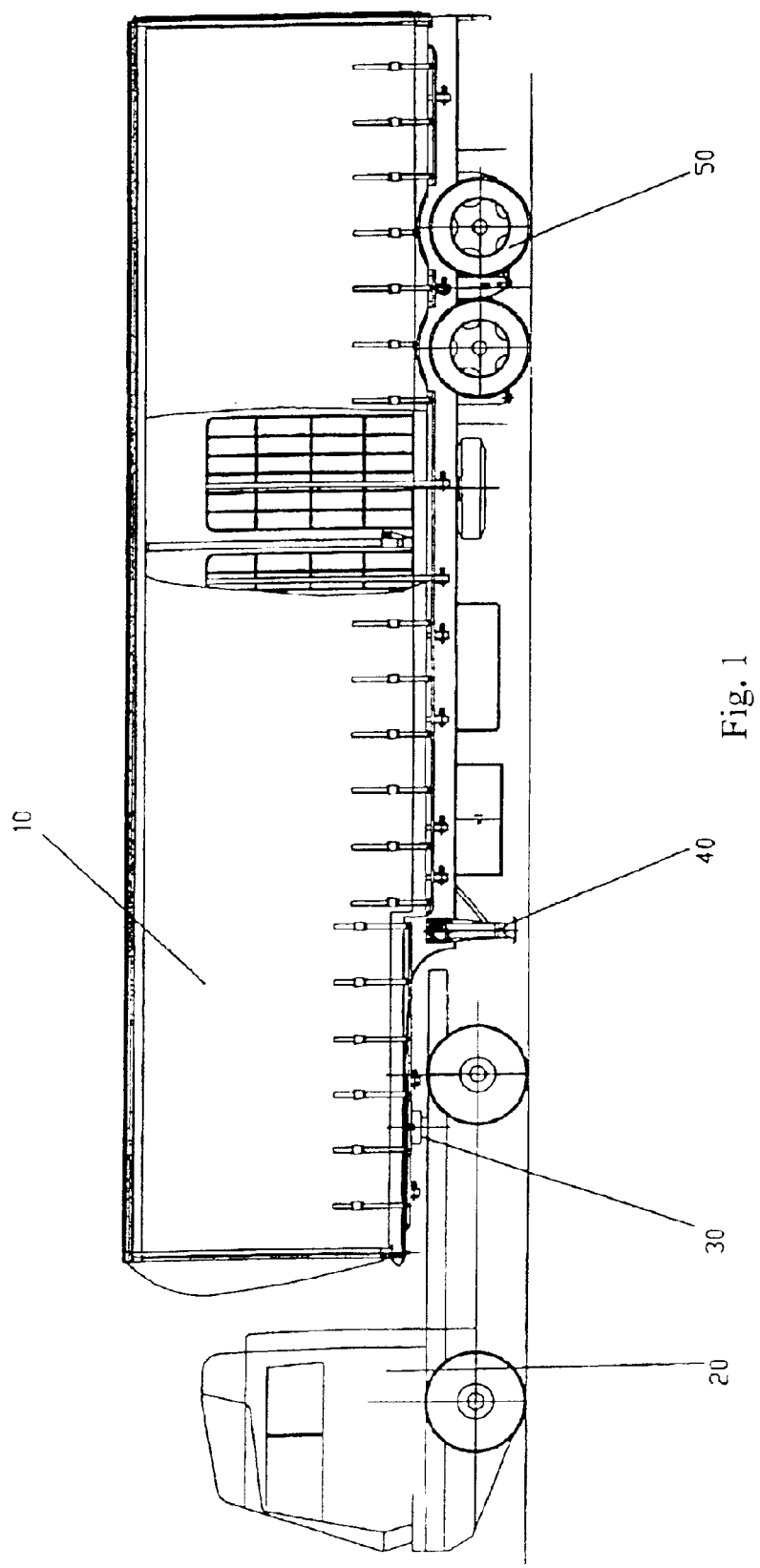
FIG. 1 shows a semi-trailer which is hitched to a tractor with its kingpin engaged into the socket at the head of the tractor according to an embodiment of the present invention.

FIG. 1 shows a semi-trailer of an embodiment of the present invention which is hitched to a tractor with its kingpin engaged into the socket at the head of the tractor. In the figure, numeral 10 represents the semi-trailer of an embodiment of the invention; numeral 20 represents the tractor; numeral 30 represents the pulling socket on the tractor, into which the kingpin on the chassis of the semi-trailer is engaged; numeral 40 represents the support leg of the semi-trailer; and numeral 50 represents the wheels of the semi-trailer.

Figure 2:
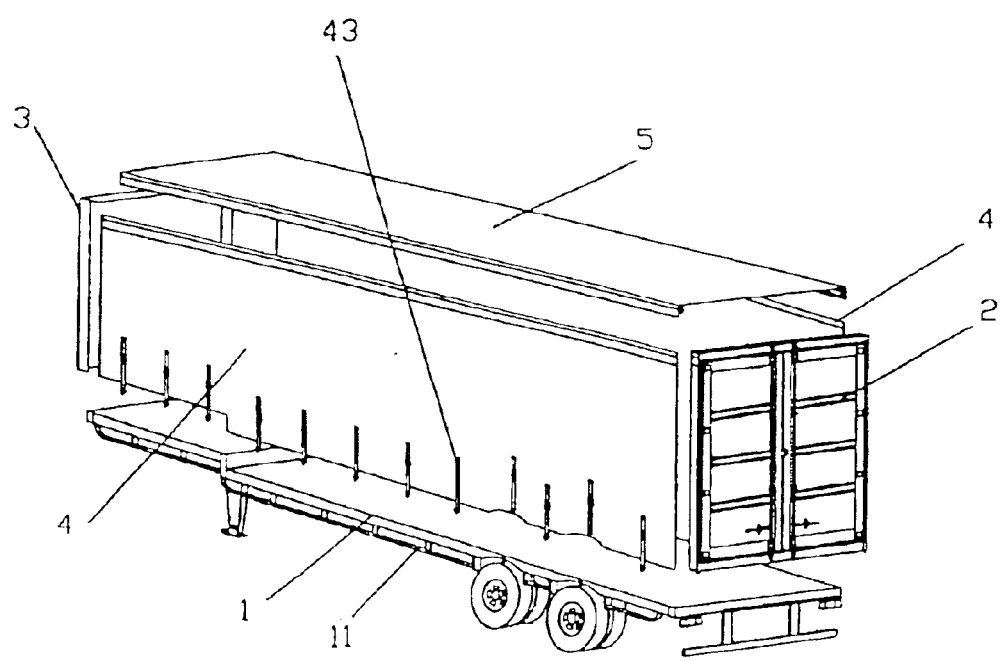
FIG. 2 shows the assembling and disassembling of the semi-trailer having soft body side wall assemblies according to an embodiment of the present invention.
Figure 3:
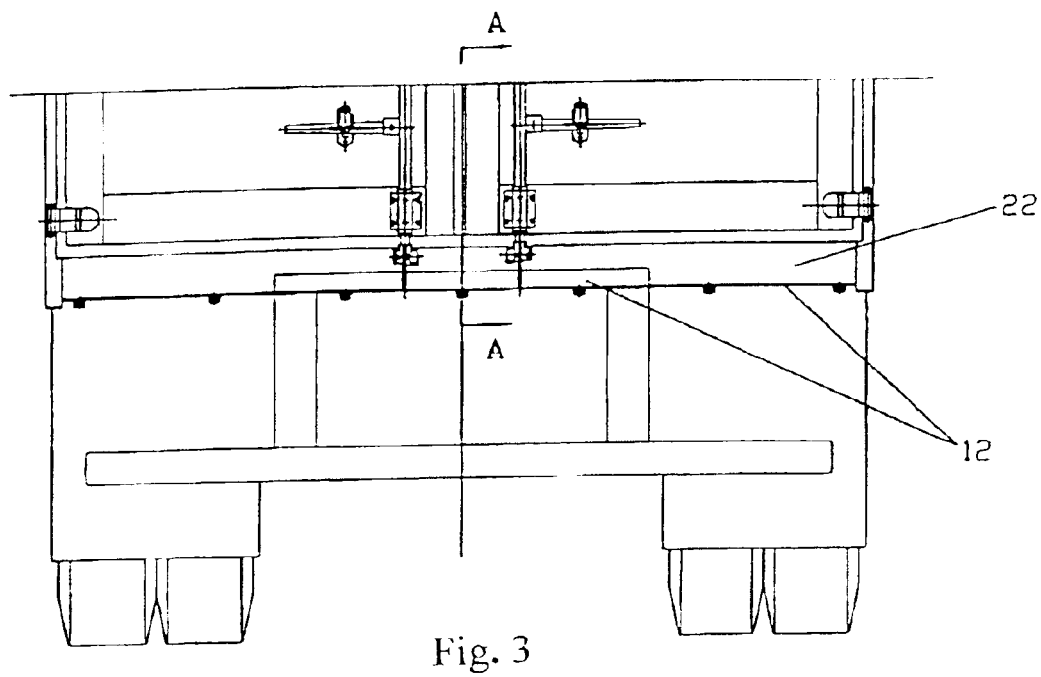
FIG. 3 shows the connection between the rear frame assembly and the chassis assembly of an embodiment of the present invention.
Figure 4:
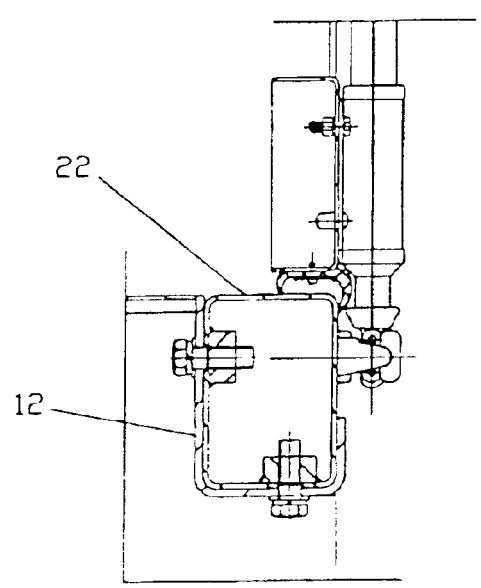
FIG. 4 shows an enlarged cross sectional view taken along the A—A line of FIG. 3.
Figure 5:
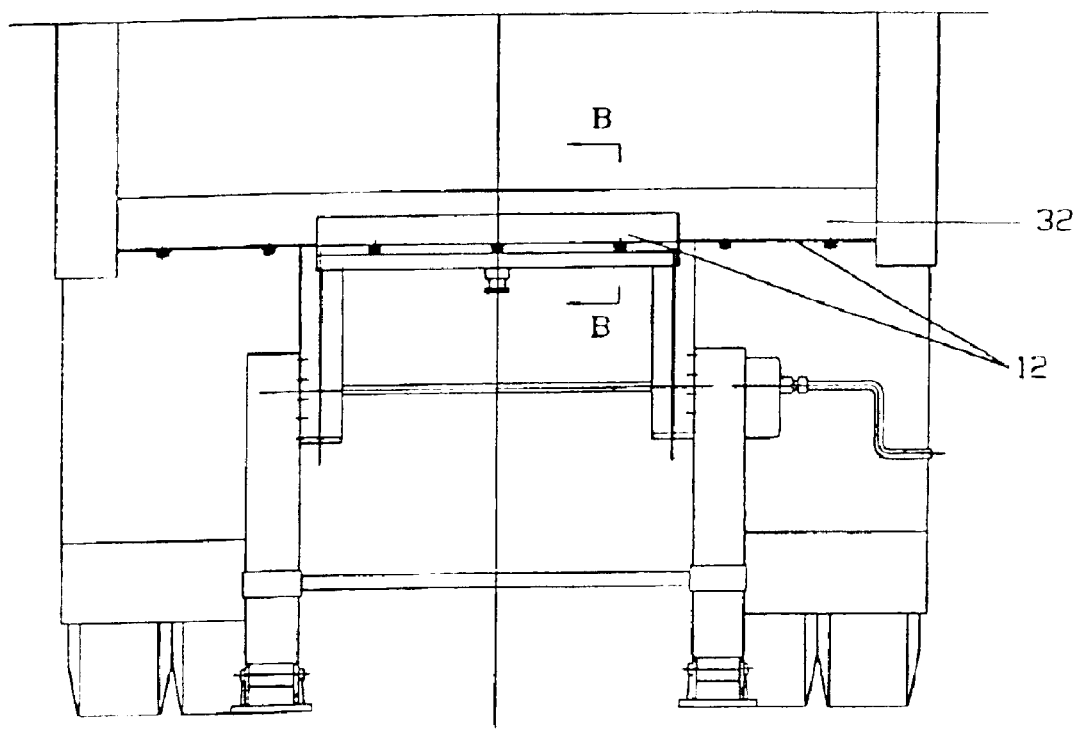
FIG. 5 shows the connection between the front wall assembly and the chassis assembly of an embodiment of the present invention.
Figure 6:
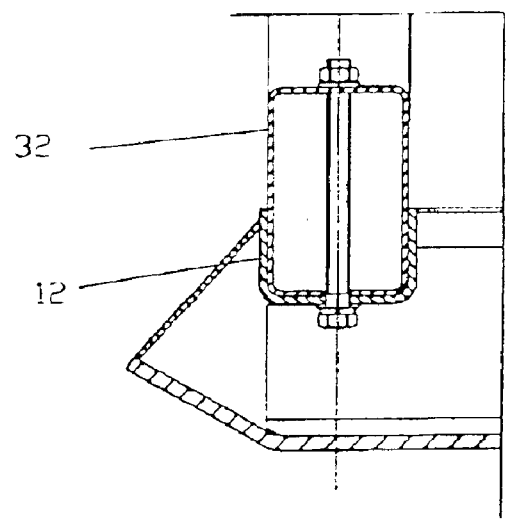
FIG. 6 shows an enlarged cross sectional view taken along the B—B line of FIG. 5.

As shown in FIG. 2, the semi-trailer of this embodiment consists of a chassis assembly 1, a rear frame assembly 2, a front wall assembly 3, side wall assemblies 4 and a root assembly 5, where the top assembly (rear, front, side and roof assemblies) may be entirely of hard body structure (i.e., all assemblies are made of hard materials, which may be selected from steel, aluminum and composite materials, etc.) to make up a hard carriage semi-trailer. The top assembly may also be of partial hard body and partial soft body structure (i.e., some assemblies are made of soft material such as canvas, composite material of fiber and rubber, e.g., the side wall assemblies may be made of canvas) to make up a soft carriage semi-trailer. The rear, front and roof assemblies may also be made of a combined structure with hard material frames and soft material coverings. The chassis assembly 1 can be combinably and removably jointed to the rear frame assembly 2, front wall assembly 3 and the side wall assemblies 4; the roof assembly 5 can be combinably and removably jointed to the rear frame assembly 2, front wall assembly 3 and the side wall assemblies 4; the side wall assemblies 4 can be combinably and removably jointed to the rear frame assembly 2 and the front wall assembly 3.

FIGS. 3–6 illustrate the connecting structure between the semi-trailer chassis assembly and the rear and front wall assemblies. On both of the front and rear end of the chassis assembly 1 are installed fixing means 12 having a U-shape section inner space. On the bottom side of the rear frame assembly 2 is installed a threshold 22 corresponding to the fixing means 12. On the bottom side of the front wall assembly 3 is installed a front bottom beam 32 corresponding to the fixing means 12. The external dimensions of the threshold 22 and the front bottom beam 32 match with the inner space of the fixing means 12 correspondingly. The fixing means 12 is further connected with the threshold 22 and the front bottom beam 32 by screw connectors. When the threshold 22 of the rear frame assembly 2 and the front bottom beam 32 of the front wall assembly 3 are placed vertically into the corresponding fixing means 12, the rear frame assembly 2 and the front wall assembly 3 will be fixed automatically, i.e. they will be limited in all of the six freedom degrees of back and forth, left and right, up and down, and three directions of rotation. In addition, preferably with the further fixing with twelve M20 screw connectors on the bottom and inner sides of the fixing means 12, the connection between the rear frame assembly and the chassis assembly is completed. Since the embodiment is connected with screw connectors, it is very convenient for disassembling, and after disassembling; other top assemblies may be installed. The above connecting structure is also applicable to the connection between the front wall assembly 3 and the chassis assembly 1.

Figure 7:
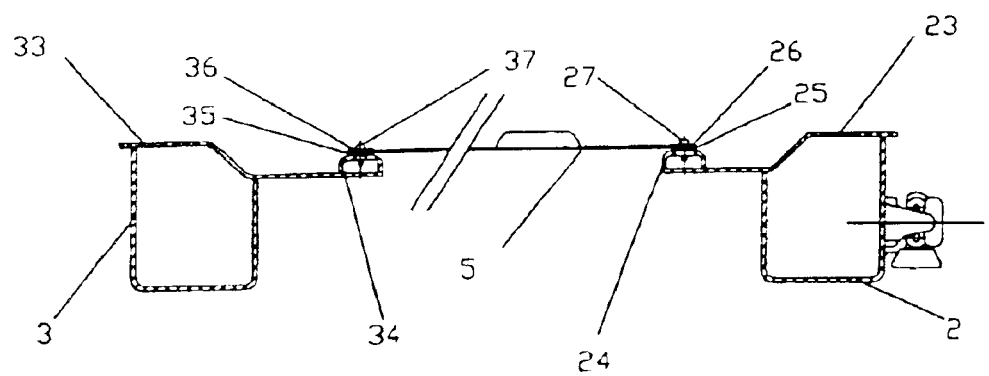
FIG. 7 shows the connection between the roof assembly and the rear and front wall assemblies of an embodiment of the present invention.

FIG. 7 illustrates an embodiment of a concrete form of connecting the roof assembly 5 with the rear frame assembly 2 and with the front wall assembly 3. As shown in FIG. 7, the way of connecting the roof assembly 5 to the top beam 33 of the front wall assembly 3 and to the top beam 23 of the rear frame assembly 2 is to place the front and back ends of the roof assembly 5 onto the fixing board 34 of the top beam 33 of the front wall assembly and the fixing board 24 of the top beam 23 of the rear frame assembly. To prevent water leakage, water proof rubber spacers 35, 25 are placed between the fixing board 34, 24 and the roof assembly 5. In addition, the plate spacers 36, 26 and screw connectors 37, 27 are used to closely connect the roof assembly 5 with the front wall and rear frame assemblies.

Figure 8:
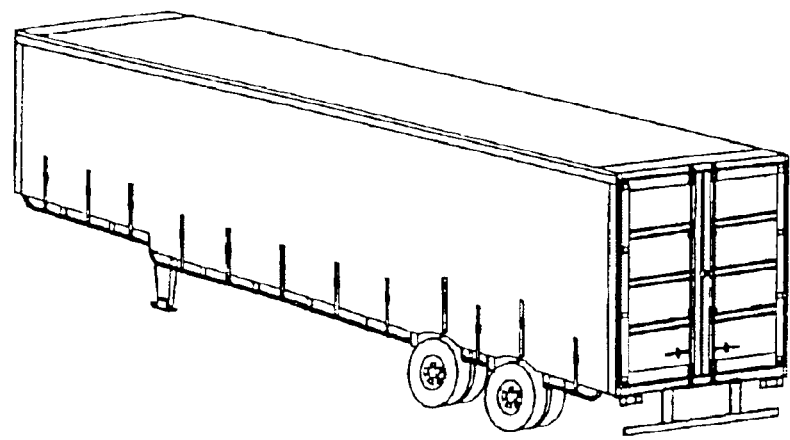
FIG. 8 shows a stereo structural diagram of the semi-trailer having soft body side wall assemblies according to an embodiment of the present invention.

FIG. 2 and FIG. 8 illustrate a typical embodiment of a soft carriage semi-trailer of this invention. In this invention, the side wall assemblies 4 are of soft body structure; other assemblies are of hard body structure.

Figure 9:
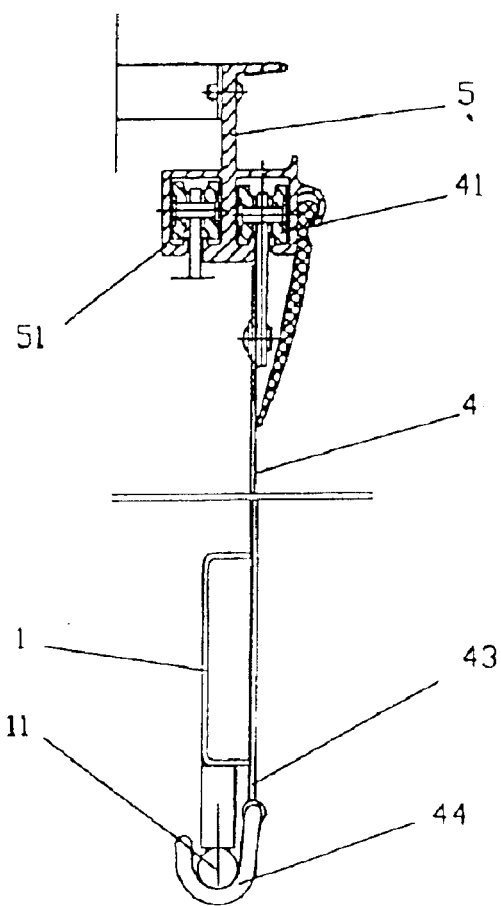
FIG. 9 shows the connection of the soft body side wall assemblies as shown in FIG. 2 with the roof assembly, and with the chassis assembly.

FIG. 9 illustrates an embodiment or the present invention of connecting the side wall assemblies 4 of the above soft carriage semi-trailer with the roof assembly 5 and with the chassis assembly 1. On the top of the side wall assemblies 4 are installed pulleys 41; on two sides of the roof assembly 5 are installed tracks 51 corresponding with the pulleys 41. By the coordination of the pulleys and the tracks, the side wall assemblies 4 are slidingly connected with the roof assembly 5. On the bottom of the two sides of the chassis assembly 1 are installed rope rails 11. On the bottom side of the side wall assemblies 4 are installed several belts 43 which can be tightened up. On the bottom ends of the belts 43 are installed belt hooks 44 corresponding with the rope rails 11. In the present embodiment, the side wall assemblies 4 are actually side curtains, of which a curtain on each side slides at the top end of the side wall to move forward toward the front wall assembly 3 or backward toward the rear frame assembly 2, so as to be convenient for loading with the curtains opened and for transportation with the curtains closed. The belts 43 and the belt hooks 44 installed on the bottom of the side curtains are used for quickly tightening up the canvas up-and-down when in operation.

Figure 10:
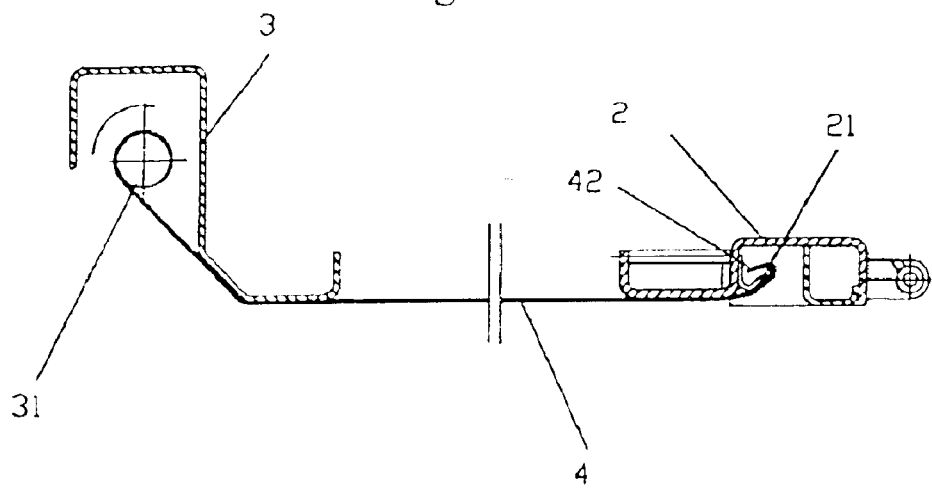
FIG. 10 shows the connection of the soft body side wall assemblies as shown in FIG. 2 with the rear and front wall assemblies.

FIG. 10 illustrates an embodiment of the present invention of connecting the side wall assemblies 4 of the soft carriage semi-trailer with the rear frame assembly 2 and with the front wall assembly 3. On the rear end of the side wall assemblies 4 are installed hooks 42, on two sides of the rear frame assembly 2 are installed bending hanging boards 21 matching with the hooks 42, the hooks 42 are hanged on the hanging boards 21. On the two sides of the front wall assembly 3 are installed self-locking tensioners 31. The front ends of the side wall assemblies 4 are winded around the self-locking tensioners 31. The interlocking of the tensioners 31 may be realized by a ratchet.

Figure 11:
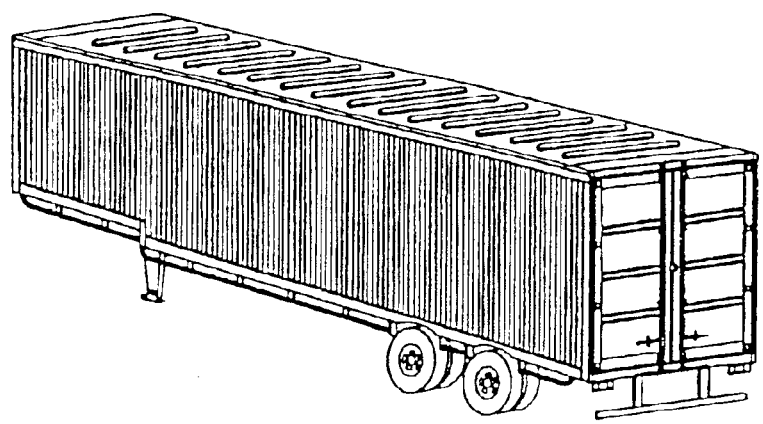
FIG. 11 shows a stereo structural diagram of the semi-trailer of which six end panel assemblies are all of hard body structure according to the present invention.
Figure 12:
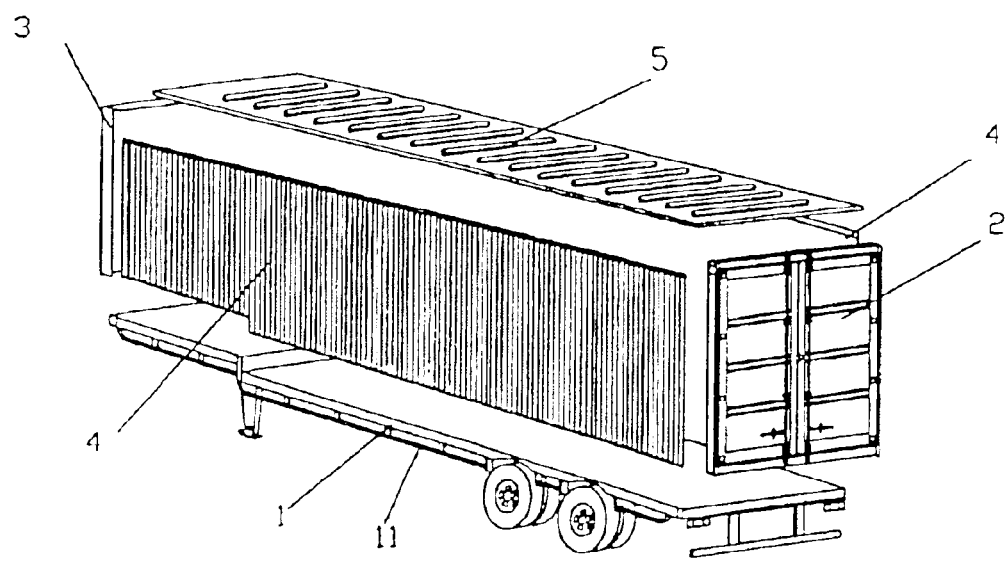
FIG. 12 shows an assembling and disassembling diagram of the semi-trailer of which six end panel assemblies are all of hard body structure according to the present invention.

FIG. 11 and FIG. 12 illustrate a typical embodiment of a hard carriage semi-trailer of this invention. In the embodiment of the present invention, the side wall assemblies 4 are of a hard body structure.

Figure 13:
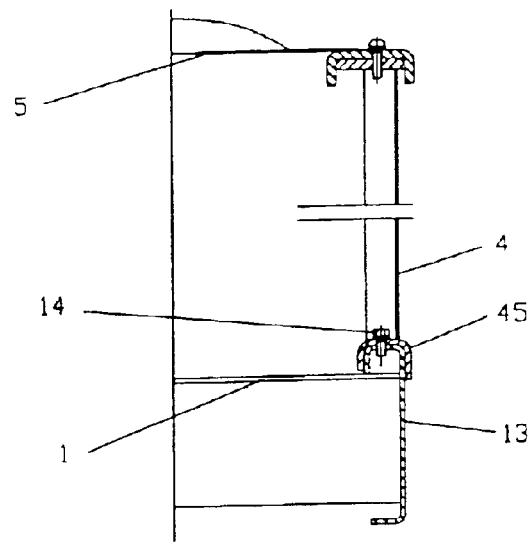
FIG. 13 shows the connection of the hard body side wall assemblies as shown in FIG. 12 with the roof assembly, and with the chassis assembly.

FIG. 13 illustrates an embodiment of the present invention of connecting a side wall assembly 4 of the hard carriage semi-trailer with the roof assembly 5 and with the chassis assembly 1. The side wall assemblies 4 are connected with the chassis assembly 1 by way of concave-convex coupling. In other words, on the two sides of the chassis assembly 1 are installed bottom side beams 13, while on the bottom of the side wall assemblies 4 are installed bottom beam 45 with a U-shaped section and with a downwards opening. The internal dimension of the bottom beam 45 matches with the external dimension of the top end of the bottom side beam 13. After they are coupled, the two parts are further secured with screw connectors 14. The installation is simple and reliable, without water leakage. The screw connectors 14 are installed at the center of the convex swelling in the side wall assemblies of the carriage, which will neither affect the outside appearance, nor the inner space. The connection between the roof assembly 5 and the side wall assemblies 4 adopt the same way of coupling, and also has the advantages such as simple installation and water proof characteristics, etc.

Figure 14:
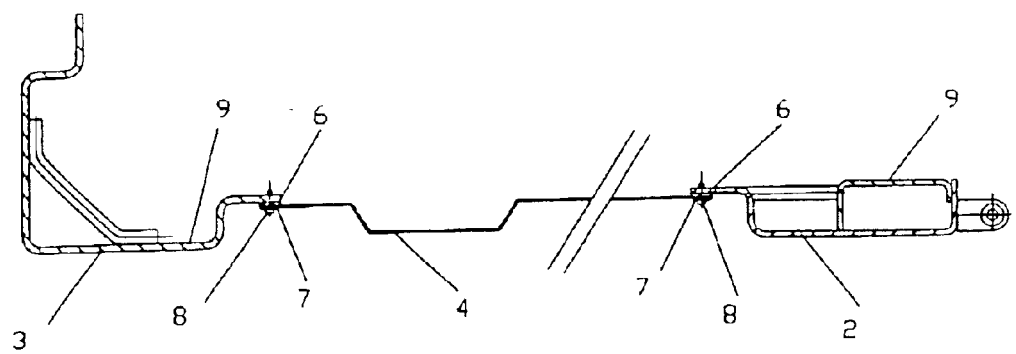
FIG. 14 shows the connection of the hard body side wall assemblies as shown in FIG. 12 with the rear and front wall assemblies.

FIG. 14 illustrates an embodiment of the present invention of connecting the side wall assemblies 4 of the hard carriage semi-trailer with the front wall assembly 3 and with the rear frame assembly 2. On the connecting points where the side wall assemblies 4 are connected with the rear frame assembly 2 and with front wall assembly 3 are installed water proof rubber spacers 6 and plate spacers 7. The water proof rubber spacers 6, plate spacers 7 and side wall assemblies 4 are pressed closely onto the corner poles 9 of the left and right sides of the rear frame assembly 2 and the front wall assembly 3 with screw connectors 8, so as to achieve the connection of the side wall assemblies 4 with the rear frame assembly 2 and the front wall assembly 3.

According to the embodiments of the present invention involving such items as the connection dimension, connection strength required and the operation space, threaded bolts, bars or nails may be adopted as the screw connectors used in the semi-trailer of this invention. Other fittings such as screw nuts, and washers may also be used when necessary.

By way of different kinds of combinations of the semi-trailers, modern transportation tools of various kinds of forms, uses and functions are available such as: flatbed semi-trailers, whole sealing semi-trailers with hard body carriages, semi-trailers with side curtains, opened cover semi-trailers, and fully covered semi-trailers.

Industrial Applicability of the Invention

According to embodiments of this invention, since different parts are combinably and removably connected, the same chassis assembly can be combined with many kinds of top assemblies to make up carriages to satisfy different demands. This allows users to assemble and disassemble on desire, and the cost for equipment procurement is reduced. The basic structure of the chassis assembly is a flatbed semi-trailer, which can be used without a top assembly to implement transportation tasks for some special goods, such as transportation for over-width, over-length goods: steel products, frames, etc. The structure can be changed with different top assemblies according to the different transportation needs of users. For instance, for long distance transportation (over 1000 km), a hard body top assembly which is safe and reliable may be adopted. For middle or short distance transportation, a soft body top assembly which is convenient for cargo loading and unloading may be adopted. Furthermore, corresponding top assemblies can be changed according to height requirements of different kinds of goods. When users over long distances, purchase the products of this invention, the products can be assembled at the delivery place so that the transportation fees for product delivery are greatly reduced, while the cost of the product is also reduced.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

What is claimed is:

1. A combinable and removable semi-trailer, comprising:
   a semi-trailer chassis assembly, with a fixing means respectively installed on a front end and a rear end of the chassis assembly, said fixing means having a U-shape section;
   a rear frame assembly, with a threshold installed on a bottom side of said rear frame assembly,
   a front wall assembly, with a front bottom beam installed on a bottom side of said front wall assembly,
   a plurality of side wall assemblies, and
   a roof assembly;
   wherein, said semi-trailer chassis assembly is combinably and removably jointed to the rear frame assembly, front wall assembly and the side wall assemblies; said roof assembly is combinably and removably jointed to the rear frame, front wall and the side wall assemblies; said side wall assemblies are combinably and removably jointed to the rear frame assembly and the front wall assembly; and
   wherein said threshold and front bottom beam align with an inner space of the U-shape section of the fixing means, said inner space of the fixing means holds said threshold and front bottom beam for stabilizing the rear frame assembly and front wall assembly, thereby realizing a connection of the chassis assembly with the rear frame assembly and front wall assembly.

2. The semi-trailer according to claim 1, wherein the semi-trailer chassis assembly is connected to the rear frame assembly and the front wall assembly with a plurality of screw connectors;
   said roof assembly is connected to the rear frame assembly and the front wall assembly with a plurality of screw connectors.

3. The semi-trailer according to claim 1, wherein said fixing means is further connected to said threshold and said front bottom beam with a plurality of screw connectors.

4. A combinable and removable semi-trailer, comprising:
   a semi-trailer chassis assembly,
   a rear frame assembly,
   a front wall assembly,
   a plurality of side wall assemblies and
   a roof assembly; and
   a fixing board respectively installed on a top beam of said rear frame assembly and a top beam of the front wall assembly, a front end and a back end of said roof assembly are placed directly onto said fixing boards, the roof assembly is connected to said front wall assembly and rear frame assembly with a plurality of connectors,
   wherein said semi-trailer chassis assembly is combinably and removably jointed to the rear frame assembly, front wall assembly and the side wall assemblies said roof assembly is combinably and removably jointed to the rear frame, front wall and the side wall assemblies; said side wall assemblies are combinably and removably jointed to the rear frame assembly and the front wall assembly.

5. The semi-trailer according to claim 4, wherein said connectors connecting said roof assembly with said front wall assembly and rear frame assembly comprise:
   a plurality of water proof rubber spacers, respectively installed between said roof assembly and the fixing boards of said front wall assembly and rear frame assembly;
   a plurality of screw connectors; and
   a plurality of plate spacers, placed between said screw connectors and said water proof rubber spacers;
   whereby a close connection of said roof assembly with the front wall assembly and rear frame assembly is realized by the combination of said water proof rubber spacers, plate spacers and screw connectors.

6. The semi-trailer according to claim 1, wherein said side wall assemblies have a soft body structure.

7. The semi-trailer according to claim 4, wherein said side wall assemblies have a soft body structure.

8. The semi-trailer according to claim 6, further comprising:
   a plurality of pulleys installed on a top of said side wall assemblies;
   a plurality of tracks corresponding with said pulleys installed on two sides of said roof assembly, whereby coordination of the pulleys and the tracks slidingly connects said side wall assemblies with said roof assembly.

9. The semi-trailer according to claim 7, further comprising:
- a plurality of pulleys installed on a top of said side wall assemblies;
- a plurality of tracks corresponding with said pulleys are installed on two sides of said roof assembly, whereby coordination of the pulleys and the tracks slidingly connects said side wall assemblies with said roof assembly.

10. The semi-trailer according to claim 6, further comprising:
- a plurality of rope rails installed on a bottom of two sides of said chassis assembly,
- a plurality of adjustable belts having bottom ends installed on a bottom side of said side wall assemblies,
- a plurality of belt hooks corresponding with said rope rails installed on the bottom ends of said belts,
- whereby during operation the belts are used for quickly tightening up said side wall assemblies, and the rope rails and belts are engaged for connecting said side wall assemblies with the chassis assembly.

11. The semi-trailer according to claim 7, further comprising:
- a plurality of rope rails installed on a bottom of two sides of said chassis assembly,
- a plurality of adjustable belts having bottom ends installed on a bottom side of said side wall assemblies,
- a plurality of belt hooks corresponding with said rope rails installed on the bottom ends of said belts,
- whereby during operation the belts are used for quickly tightening up said side wall assemblies, and the rope rails and belts are engaged for connecting said side wall assemblies with the chassis assembly.

12. The semi-trailer according to claim 6, further comprising:
- a plurality of hooks respectively installed on a rear end of each of said side wall assemblies,
- a plurality of bending hanging boards corresponding with said hooks installed on two sides of said rear frame assembly,
- wherein said side wall assemblies are connected with the rear frame assembly by hanging said hooks on said hanging boards.

13. The semi-trailer according to claim 7, further comprising:
- a plurality of hooks respectively installed on a rear end of each of said side wall assemblies,
- a plurality of bending hanging boards corresponding with said hooks installed on two sides of said rear frame assembly,
- wherein said side wall assemblies are connected with the rear frame assembly by hanging said hooks on said hanging boards.

14. The semi-trailer according to claim 6, further comprising
- self-locking tensioners installed on two sides of said front wall assembly, wherein said side wall assemblies are connected with the front wall assembly by winding a front end of each of the side wall assemblies around said tensioners.

15. The semi-trailer according to claim 7, further comprising
- self-locking tensioners installed on two sides of said front wall assembly,
- wherein said side wall assemblies are connected with the front wall assembly by winding a front end of each of the side wall assemblies around said tensioners.

16. The semi-trailer according to claim 1, wherein said side wall assemblies have a hard body structure.

17. The semi-trailer according to claim 4, wherein said side wall assemblies have a hard body structure.

18. The semi-trailer according to claim 16, wherein said side wall assemblies are connected to the chassis assembly, rear frame assembly, front wall assembly and roof assembly with a plurality of screw connectors.

19. The semi-trailer according to claim 17, wherein said side wall assemblies are connected to the chassis assembly, rear frame assembly front wall assembly and roof assembly with a plurality of screw connectors.

20. The semi-trailer according to claim 16, further comprising,
- an onwards protruding bottom side beam respectively installed on two sides of said chassis assembly,
- a bottom beam respectively installed on a bottom side of each of said side wall assemblies, each bottom beam having a downwards opening U-shape sectional inner space corresponding with each bottom side beam of the chassis assembly, such that the bottom side beam and bottom beam are coupled with each other and form a concave-convex coupling, thereby realizing a connection of the side wall assemblies with the chassis assembly.

21. The semi-trailer according to claim 17, further comprising:
- an onwards protruding bottom side beam respectively installed on two sides of said chassis assembly,
- a bottom beam respectively installed on a bottom side of each of said side wall assemblies, each bottom beam having a downwards opening U-shape sectional inner space corresponding with each bottom side beam of the chassis assembly, such that the bottom side beam and bottom beam are coupled with each other and form a concave-convex coupling, thereby realizing a connection of the side wall assemblies with the chassis assembly.

22. The semi-trailer according to claim 20, wherein further connection is realized at a convex swelling of the concave-convex coupling with a plurality of screw connectors.

23. The semi-trailer according to claim 21, wherein further connection is realized at a convex swelling of the concave-convex coupling with a plurality of screw connectors.

24. The semi-trailer according to claim 20, wherein said roof assembly is connected to the side wall assemblies with a concave-convex coupling.

25. The semi-trailer according to claim 21, wherein said roof assembly is connected to the side wall assemblies with a concave-convex coupling.

26. The semi-trailer according to claim 16, further comprising
- a plurality of corner poles, wherein one of the corner poles is respectively installed on each of a plurality of sides of said front wall assembly and a plurality of sides of said rear frame assembly, for connecting the rear frame assembly and front wall assembly with the side wall assemblies.

27. The semi-trailer according to claim 17, further comprising
- a plurality of corner poles wherein one of the corner poles is respectively installed on each of a plurality of sides of said front wall assembly and a plurality of sides of said rear frame assembly, for connecting the rear frame assembly and front wall assembly with the side wall assemblies.

28. The semi-trailer according to claim 26, further comprising:

a plurality of water proof rubber spacers and plate spacers installed on a connecting point of said side wall assemblies where the rear frame assembly and front wall assembly connect with the side wall assemblies, wherein said water proof rubber spacers, plate spacers and side wall assemblies are pressed closely onto the corner poles of the sides of the rear frame assembly and front wall assembly with a plurality of screw connectors, thereby realizing a connection of the side wall assemblies with the rear frame assembly and front wall assembly.

29. The semi-trailer according to claim 27, further comprising:

a plurality of water proof rubber spacers and plate spacers installed on a connecting point of said side wall assemblies where the rear frame assembly and front wall assembly connect with the side wall assemblies, wherein said water proof rubber spacers, plate spacers and side wall assemblies are pressed closely onto the corner poles of the sides of the rear frame assembly and front wall assembly with a plurality of screw connectors, thereby realizing a connection of the side wall assemblies with the rear frame assembly and front wall assembly.

30. The semi-trailer according to claim 2, wherein said screw connectors are selected from the group consisting of threaded bolts, bars and nails.

31. The semi-trailer according to claim 18, wherein said screw connectors are selected from the group consisting of threaded bolts, bars and nails.

32. The semi-trailer according to claim 19, wherein said screw connectors are selected from the group consisting of threaded bolts, bars and nails.

* * * * *